A. S. WHITTEMORE.
SUPPORTS FOR PILLOW SHAMS.

No. 184,678. Patented Nov. 21, 1876.

UNITED STATES PATENT OFFICE.

ALBERT S. WHITTEMORE, OF WINDHAM, CONNECTICUT.

IMPROVEMENT IN SUPPORTS FOR PILLOW-SHAMS.

Specification forming part of Letters Patent No. 184,678, dated November 21, 1876; application filed September 18, 1876.

*To all whom it may concern:*

Be it known that I, ALBERT S. WHITTEMORE, of Windham, in the county of Windham and State of Connecticut, have invented an Improvement in Supports for Pillow-Shams; and I do hereby declare that the following is a full, clear, and exact description of the same, reference being had to the accompanying drawing, which forms part of this specification.

My invention has for its object a support for pillow-shams, whereby the pillow-shams are kept extended upon the pillow, whereby they may be handled without soiling or rumpling, and whereby they may be conveniently hung up in an extended state, by which means such pillow-shams are kept clean and neat much longer, and much labor in washing and ironing the same is saved.

My invention consists in a bar provided with spring catches or fastenings at or near its ends, for attachment to a pillow-sham, a loop near the middle being provided for suspending the same when the pillow-sham is not spread upon the pillow.

Figure 1:
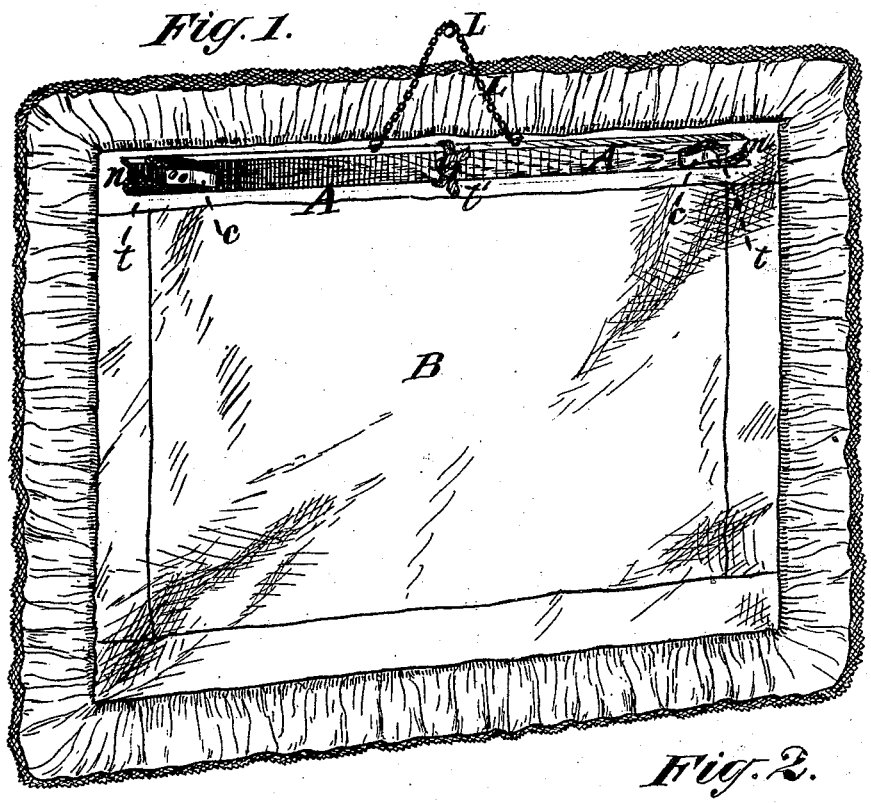
Figure 2:
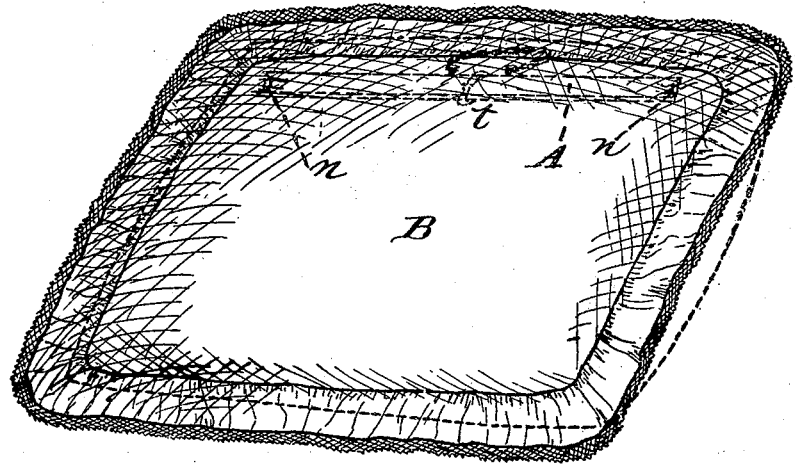

Figure 1 in the accompanying drawing represents my improved support for pillow-shams with a pillow-sham supported thereon, and the whole suspended from a nail, in the manner intended, when the said pillow-sham is removed from the pillow, and is desired to be kept neat and clean for further use, the under side of the pillow-sham being shown. Fig. 2 represents the same when the pillow-sham is spread upon a pillow.

A is a bar, preferably made of wood and of ornamental design. Near the ends, which are preferably notched, as shown at $n$, are attached spring-catches $c$, Fig. 1, with which short pieces of tape $t$, attached to the under side of the pillow-sham B, engage when said tapes or strings are brought under said spring-catches, said tapes being first passed through the notches $n$; but other methods of attaching said bar at the ends may be employed. Attached to the under side of the pillow-sham is another piece of tape, $t'$, which is tied about the middle of the bar A; but this attachment may be omitted. Near the middle of the bar A is attached a loop, L, Fig. 1, of chain, cord, or other suitable material, which serves as a means for suspending the said bar, when attached to the pillow-sham, from a hook or nail, when desired.

In use the pillow-sham, attached to the said bar A, as described, is spread over the pillow, as shown in Fig. 2, the said bar resting longitudinally upon the top of the pillow, and being covered and hidden by the pillow-sham.

To lift the pillow-sham from the pillow, the hand is passed under the top of the same, and the bar A is used to raise the whole from its position on the pillow, and to suspend it in an unwrinkled and smoothly-extended state from a suitable support by means of the loop L.

I claim—

A pillow-sham supporter consisting of a bar with attached catches or fastenings for the pillow-sham, and a loop by which to suspend it, substantially as herein described.

A. S. WHITTEMORE.

Witnesses:
E. F. WHITTEMORE,
HENRY F. ROYCE.